US011074058B1

(12) United States Patent
Mowatt et al.

(10) Patent No.: US 11,074,058 B1
(45) Date of Patent: Jul. 27, 2021

(54) DEPLOYMENT OPERATIONS BASED ON DEPLOYMENT PROFILES IN A DEPLOYMENT SYSTEM

(71) Applicant: MICROSOFT TECHNOLOGY LICENSING, LLC, Redmond, WA (US)

(72) Inventors: David Mowatt, Dublin (IE); Alan Noel Mulhall, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/917,630

(22) Filed: Jun. 30, 2020

(51) Int. Cl.
*G06F 8/61* (2018.01)
*G06F 8/77* (2018.01)
*G06F 21/10* (2013.01)
*G06F 3/0481* (2013.01)
*G06F 8/71* (2018.01)

(52) U.S. Cl.
CPC ............ *G06F 8/64* (2013.01); *G06F 3/04817* (2013.01); *G06F 8/71* (2013.01); *G06F 8/77* (2013.01); *G06F 21/105* (2013.01)

(58) Field of Classification Search
None
See application file for complete search history.

(56) References Cited

U.S. PATENT DOCUMENTS

| | | | | |
|---|---|---|---|---|
| 8,924,515 B1* | 12/2014 | Bone | ................... | H04L 41/0806 709/219 |
| 2007/0006122 A1* | 1/2007 | Bailey | ....................... | G06F 8/61 717/101 |
| 2013/0124720 A1* | 5/2013 | Wood | .................. | G06F 11/3495 709/224 |
| 2013/0311628 A1* | 11/2013 | Kruglick | ................... | G06F 8/61 709/223 |
| 2014/0244762 A1* | 8/2014 | Wyndowe | ............... | H04L 67/10 709/205 |
| 2014/0283092 A1* | 9/2014 | Mowatt | .................. | G06F 21/105 726/26 |
| 2016/0379292 A1* | 12/2016 | Mowatt | ................. | G06F 9/4451 705/26.7 |
| 2018/0081911 A1* | 3/2018 | Mowatt | ..................... | G06F 9/54 |
| 2019/0018671 A1* | 1/2019 | Zhu | ...................... | G06F 11/3452 |
| 2019/0347585 A1* | 11/2019 | Mowatt | ............. | G06Q 10/0633 |

* cited by examiner

*Primary Examiner* — Philip Wang
(74) *Attorney, Agent, or Firm* — NovoTechIP International PLLC

(57) ABSTRACT

Methods, systems, and computer storage media for providing and removing deployment packages using deployment system operations of an integrated deployment strategy in a deployment system. The integrated deployment strategy includes programmatically defined deployment operations that are associated with deployment profiles for intelligent structured and coordinated deployment of deployment packages. In operation, based on one or more scores (e.g., early adopter score, fit scores, usage propensity score) of a first set of deployment profiles for a first plurality of users, deployment operations are performed to cause execution of a deployment package for clients associated with the first plurality of users. Based on deployment data of the deployment package, the first set of deployment profiles, and a second set of deployment profiles, a second plurality of users are identified for executing the deployment package. The second plurality of users is associated with one or more scores of the second set of deployment profiles.

20 Claims, 8 Drawing Sheets

US 11,074,058 B1

DEPLOYMENT OPERATIONS BASED ON DEPLOYMENT PROFILES IN A DEPLOYMENT SYSTEM

BACKGROUND

Users rely on deployment systems for receiving software packages and software updates for different types of applications on client computing devices. A deployment system, such as an organization deployment system, manages large groups of user and clients. For example, a deployment system provides remote control, patch management, software distribution, operating system deployment, network access protection, and hardware and software inventory. Conventional deployment systems are limited in their ability to provide deployment system operations that avoid unnecessary operations which are overly-inclusive of users and clients without consideration of additional factors associated with users and clients, or organization environments (i.e., distributed or cloud computing system tenant). As deployment systems continue to support deploying applications on clients for users, improving deployment system operations can result in more effective and efficient deployment systems.

SUMMARY

Various aspects of the technology described herein are generally directed to systems, methods, and computer storage media, for among other things, providing and removing deployment packages using deployment system operations of an integrated deployment strategy in a deployment system. The integrated deployment strategy includes programmatically defined deployment operations that are associated with a deployment profiles for intelligent structured and coordinated deployment of deployment packages. In particular, the deployment system includes a deployment system engine (server-side and client-side) that processes deployment profiles of deployment computing objects (e.g., user, client, organization, cloud-provider, and scoring models) to implement and revise the integrated deployment strategy that includes selectively deploying and removing deployment packages to clients. The deployment profiles specifically includes scores (e.g., early adopter score, fit score, relationship score, usage propensity score, deployment-specific usage propensity score, diversity score) based on a scoring models that analyze application usage data and deployment data. The deployment profiles are generated based on the application usage data and deployment data for attributes of the deployment computing objects. Based on the deployment profiles, additional deployment system operations of the integrated deployment strategy can be performed using deployment or removal tracking instructions, updated deployment instructions, relationships between users, organization messages, and reclaiming application licenses.

In operation, a first set of deployment profiles for a first plurality of users are accessed. Based on the deployment profiles, deployment operations are performed to cause execution of a deployment package on clients associated with the first plurality of users. Based on deployment data of the deployment package and the first set of deployment profiles, a second plurality of users are identified for executing the deployment package. The second plurality of users associated with a second set of deployment profiles. The deployment data, the first set of deployment profiles, and the second set of deployment profiles support updating an integrated deployment strategy of the deployment package.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
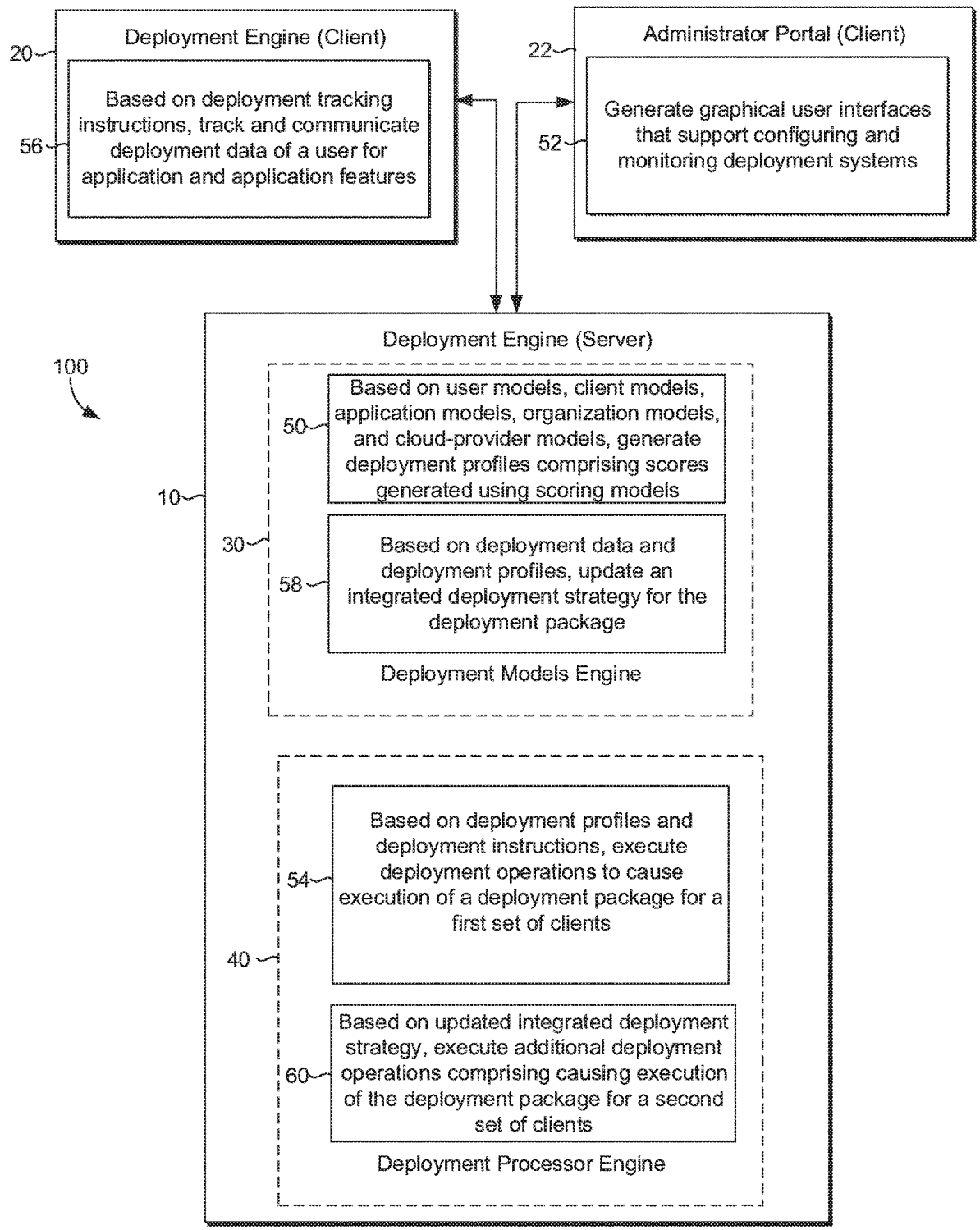
FIG. 1 is a block diagram of an exemplary deployment system environment for providing deployment operations based on deployment profiles in a deployment system, suitable for use in implementing aspects of the technology described herein.

Overview of Technical Problems, Technical Solutions, and Technological Improvements Deployment systems or organization deployment systems can refer to systems management software products for managing large groups of users and clients (computing devices) that are running different types of applications. Deployment systems can provide a variety of functionality including providing configuration changes, feature updates, remote control, patch management, software distribution, operating system deployment, network access protection and hardware and software inventory. The deployment system performs deployment operations in association with clients and users (e.g., user base) of applications (e.g., mobile apps and desktop apps). Apps or client apps generally refer to software that is downloaded to a client or software that runs on a server (e.g., web application) that is accessed using a client. In this regard, apps can include client-deployed and server-side software and services (e.g., word processor, spreadsheet, and presentation apps) that operate as productivity tools. With the different types of apps, in practice, only a subset of apps add value to a subset of users relative to the entire user base of an organization supporting multiple user groups (e.g., an organization with cohorts).

Conventional deployment systems are limited in their ability to provide deployment system operations in that deployment operations are unnecessary for certain users and clients without consideration of additional factors associated with users and clients, or organization environments. Given that, practically, applications and specifically application features are used differently by different users, administrators of the deployment system may not adequately understand the user behavior relative to applications, as such, deployment decisions may not align to actual user behavior or need relative to the applications.

Currently, several different shortcomings result from using a manual approach in conventional deployment systems when making deployment decisions for users and clients. At a high level, the selection process for users and clients is based on convenience for the administrator rather than based on statistically valid or objective criteria. The result identified set of users suffered from biased sampling and risked deployed applications that are never adopted as the initial set of users was too homogenous to find traction. In one example, an administrator manually and tediously determines users that are early adopters of applications and application features. In another example, a manager identifies a user who is a power user of the application or a user who may work in the IT department, so that user is selected as an early adopter. In addition, user-specific or client-specific data are not integrated in a unified deployment strategy. For example, the amount of hard drive space on a client, an amount of bandwidth needed for deployment packages, changes to the client interface as a result of the deployment are not considered in combination with user behavior. Further, applications can be unnecessarily be installed on clients where a user does not use the application. Installing unneeded applications will cause further inefficiency since those applications will consume network, storage and computational processes to be constantly that need to be managed (e.g., patched). Installing unneeded applications may also incur cloud computing cost for any service-based features which are companion to that application.

Moreover, feedback from deployments can be lacking or anecdotal and may not be used to inform additional deployment decisions. Relationships between users are not taken into account when developing a deployment strategy. As such, a deployment decision to update an application in a manner that is inconsistent with user behavior may have negatively impact clients running the applications (i.e., consuming additional resource cycles) and the user experience (e.g. crowding the user interface with unneeded functions). Conventionally, there exist organizational impacts that can be factors that are not automatically part of the deployment strategy when making deployment decisions. For example, emails to get user adoption of new applications, user resistance to changes, cost of unused application licenses are managed separately from the clients and users. As such, a comprehensive deployment system with an alternative basis for executing deployment system operations can improve computing operations and interfaces in deployment systems.

Embodiments of the present invention are directed to simple and efficient methods, systems, and computer storage media for providing and removing deployment packages using deployment system operations of an integrated deployment strategy in a deployment system. The integrated deployment strategy includes programmatically defined deployment operations that are associated with a deployment profiles for intelligent structured and coordinated deployment of deployment packages. In particular, the deployment system includes a deployment system engine (server-side and client-side) that processes deployment profiles of deployment computing objects (e.g., user, client, organization, cloud-provider, and scoring models) to implement and revise the integrated deployment strategy that includes selectively deploying and removing deployment packages to clients. The deployment profiles specifically includes scores (e.g., early adopter score, fit score, relationship score, usage propensity score, deployment-specific usage propensity score, diversity score) based on a scoring models that analyze application usage data and deployment data. The deployment profiles are generated based on the application usage data and deployment data for attributes of the deployment computing objects. Based on the deployment profiles, additional deployment system operations of the integrated deployment strategy can be performed using deployment or removal tracking instructions, updated deployment instructions, relationships between users, organization messages, and reclaiming application licenses.

In operation, a first set of deployment profiles for a first plurality of users are accessed. Based on the deployment profiles, deployment operations are performed to cause execution of a deployment package on clients associated with the first plurality of users. Based on deployment data of the deployment package and the first set of deployment profiles, a second plurality of users are identified for executing the deployment package. The second plurality of users associated with a second set of deployment profiles. The deployment data, the first set of deployment profiles, and the second set of deployment profiles support updating an integrated deployment strategy of the deployment package.

Aspects of the technical solution can be described by way of examples and with reference to FIG. 1. FIG. 1 illustrates a deployment system 100 having a deployment system engine (server) 10 and a deployment system engine (client) 20. The deployment system 100 also includes a deployment models engine 30 and a deployment processor engine 40. The deployment system provides and performs improved deployment system operations and interfaces to support the functionality of technical solution in a technical solution environment having components described herein with reference to FIG. 6, FIG. 7 and FIG. 8.

At step 50, the deployment models engine 30 supports generating computing models that are computing, mathematical, data structure representations of data or include data that are associated with deployment computing objects (e.g., client, server, user, application, organization, and cloud-provider). The deployment models engine 30 can model deployment and removal computing objects. Modeling the deployment computing objects is based on deployment operations attributes of the computing objects that are used for deploying applications to clients associated with a user base of an organization. As used herein, deployment operations can include installing or adding and uninstalling or removing applications, applications features, application icons, and application configurations, as discussed in more detail below.

The models can be used to generate deployment profiles for the deployment computing objects. The deployment profiles are specifically representations of the computing models, where the deployment profiles are generated based on deployment operations data. In particular, a deployment profile stores relevant deployment operations data associated with the deployment computing objects such that an integrated deployment strategy (e.g., programmatically defined deployment operations and deployment instructions) can be generated and updated using the deployment profiles. In addition to users having corresponding user deployment profiles, other computing objects can be associated with corresponding deployment profiles, such as, a client deployment profile, an organization deployment profile, and a cloud-provider deployment profile. The organization can be associated with an entire user base or segments of the user base (e.g., cohorts). It is contemplated that the cloud-provider may implement deployment operations, as described herein, across different organizations, when making deployment decisions across the distributed computing system environment. As discussed herein in more detail, scores can be generated for corresponding deployment operations attributes of the clients, users, organizations, and the cloud-provider.

Overall, tracking of user activity can be utilized for different applications and application features for generating the different scores for different deployment profiles. The deployment profile includes different scores (e.g., early adopter score, fit score, relationship score, usage propensity score, deployment-specific usage propensity score, diversity score) that are generated using computing models (e.g., user model, client model, organization model, and cloud-provider model) defined based on deployment operations. For generating score stored in a deployment profile, user activity (i.e., application usage data or user behavior) can be tracked relative to an application or an application feature.

The models can be used to generate an early adopter score that supports identifying users that use applications and application features and which user should get a deployment package of a new application and a new application features. The early adopter score is generated based on usage data of an application and application features, where attributes of the application and application features are accessed using an application model. For example, a delay period between when the application is deployed to a client associated with the user and when the user uses the application can usage data that is incorporated into a user deployment profile.

The early adopter can indicate a quantified level of usage of an existing application or application feature. More specifically, the early adopter score can indicate the speed with which the user adopted the particular application or application feature. The early adopter score hints at which users are likely to use new features or new applications. In this regard, the early adopter score supports identifying users which users are using an application. Additionally, users' early adopter scores can be supplemented based on external data or a designation as an early adopter may be based on explicitly tagging the user as an early adopter. For example, a user can be designated (e.g., by an administrator, a device type/model, or a manager of the user) as an early adopter based their position in organization, knowledge of the application and application features. Alternatively, an administrator may block or override the designation of particular user as early adopters.

The models can also be used to generate a fit score that supports determining whether an application should be deployed in association with a user as part of the integrated deployment strategy. The fit score can be generated based on comparing a first set of user attributes of a first user to a second set of user attributes of a second user. For example, the fit score is generated based on matching algorithm (e.g., a graph using edges to show common attributes between users for an application or application feature). At a high level, a second user can have a high fit score for a first user if they share common usage attributes for an application and application feature. In this regard, the fit score indicates a quantified level of common usage of the application or application feature. As discussed in more detail below, the fit score can be used to identify the second user as a candidate for a deployment package when the first user has a high early adopter score for the deployment package. Specifically because of the high fit score there exists a high likelihood of the second user having a high early adopter score for the deployment package.

The usage propensity score can be generated based on the early adopter score and fit score. The usage propensity score indicates a quantified level of a propensity to be both an early adopter and a user of an application. The usage propensity score can specifically identify a weighting scheme for the early adopter score and the fit score (e.g., 0.7 early adopter score weight and 0.3 fit score weight). For example, for a new application feature of application that is being deployed to 1000 users of an organization, an early adopter score can be generated for each of the 1000 users and fit score can also be generated for each of the 1000 users. Based on a predetermined weighting scheme of the deployment assessment score, the early adopter score and the application fit score can be combined to generate the usage propensity. A top N users (e.g., 200 users) can be selected from the 1000 users.

Moreover, a deployment-specific usage propensity score can be generated based on deployment data for a set of users. Continuing with the example above, after identifying 200 users, a deployment package can be caused to be executed for clients of the 200 users. Based on an identified threshold (e.g., early adopter score for the deployment package), 140 users can identified as early adopters of the deployment package (above the threshold) and 60 users identified as non-early adopters (below the threshold). A model deployment package user can be generated based on comparing the user attributes of the 140 users and the 60 user. In the particular, user attributes and differences (e.g., deployment data, job title, department, geography) of the 140 users and 60 user are analyzed (e.g., a matching algorithm) to generate the model deployment package user. For example, a difference between a first user in the 140 users and a second user in the 60 users can be based on the first user being a faculty member and the second user being a student. As such, the user attributes (e.g., job title, geographical location) and differences can be based on categorical designations of the particular organizations (e.g., educational institutions, tech companies, hospitals).

The model deployment package user is used to generate a deployment-specific usage score for each of the remaining 1000 users (800 users). For example, a user can have a high deployment-specific propensity score if they share common usage attributes with the model deployment package user that is based on the comparing the 140 users and the 60 users. It is contemplated that deployment-specific propensity score can be weighted based on a relationship score as discussed in more detail below. Based on a threshold deployment-specific usage score, 500 users may be identified out of 800 user, and the 500 user can received the deployment package. The remaining 300 users will not receive the deployment package. It is contemplated that, for the 60 users, deployment operations can be executed to remove the deployment package from their corresponding clients.

The models can further be used to generate a relationship score that supports quantifying connections between users such that the connections can be used to determine whether a deployment package is deployed in association with user. For example, the organization model can include user information (e.g., organizational information) that can be used to score relationships between individual users and segments of users. In this regard, the relationship score can be based on user attributes including hierarchy in the organization, geographic location, and job title. User attributes are compared a relationship score can quantify a connectedness (e.g., similarity or interaction) between two users. For example, the user title or hierarchy in organization chart can be used to infer a high likelihood of similar user behavior with regard the same deployment package. As discussed in more detail below, a high likelihood of similar behavior as quantified in a relationship can support identifying deployment operations specifically for collaboration applications. In another example, a relationship score can be used to deploy an application to a subset of identified users that would find the feature useful before deploying the application to the full set of identified users. For example, if 10 users can receive a new application feature (e.g., improve the individual user's efficiency), but the 10 users' usage data are really similar, it may be more efficient to confirm that just 2 of them find the new feature useful before deploying the new application feature to the other 8 users. Advantageously, more insight could be gained from deploying the new application feature to 2 users in contrast to deploying the new application feature to all users.

The models can further be used to generate a diversity score that supports deliberately identifying a set of users from early adopters with diverse user attributes. For example, the organization model can include user attributes that can be used to score user attributes between users. In this regard, the diversity score indicates a quantified level of difference, based on one or more attributes, for users. The diversity score may specifically be generated for the first set of users (e.g., identified based on usage propensity scores) to receive the deployment package. In one implementation, a penalty model can be used for generating the diversity score, where a first user and a second user are penalized or downgraded in their individual diversity scores based on sharing similar user attributes, compared to a third user that does not share the same attributes.

By way of example, for 1000 users 200 users may be identified as early adopters. A subset of 50 users can be identified for performing deployment operations based on the diversity score of the 50 users for a selected attribute. The selected attribute could be department. Thus, comparing the individual user attributes between 200 users can generate a list of 50 users with the most diversity with reference to departments. It is contemplated that different sets of 50 users can receive diversity scores such that administrator manually elects which set of users to proceed with the deployment operations, as appropriate. Advantageously, a more diverse set of users would allow for deployment operations with more insightful deployment data.

Usage data and deployment data for deployment operations attributes can specifically identify the user based on a unique identifier, an event (e.g., user insert icon, user conversation tracking, and open announcement email), a date, and a frequency count. In another example, for a specific application, each application feature can have a global usage average (e.g., global usage score) that indicate usage or popularity of a particular application feature (e.g., selectable interface UI element, or a ribbon that is a graphical control element in the form of a set toolbars). It is contemplated that a given user can receive an early adopter score based on how many of the less frequently application features they have used within a given threshold period of time.

Tracking can include several different types of direct deployment operations attributes and indirect deployment operations attributes. Direct deployment operations attributes include user activity associated with directly using the application or application features, while indirect deployment operations attributes can include deployment operations attributes associated with operational activity. For example, direct deployment operation attributes can include the number of times a user launched a particular feature of an application, while indirect deployment operation features can include a number of times the end-user engages with emails or announcements received from an administrator of the deployment system or in-product pop-up. Other variations and combinations of direct deployment operation attributes and indirect operation attributes with respect to different computing objects are contemplated with embodiment described herein. Usage data or deployment usage data can be tracked based on usage data tracking instructions or deployment usage data tracking instructions that are programmatically defined to retrieve deployment operations information that is used for defining the integrated deployment strategy.

At step 52, administrator portal 22 on an administrator client is generated to provide interfaces (e.g., graphical user interfaces) that support configuring and monitoring the deployment systems. For example, the portal include administrator tools (e.g., snap-ins) for receiving administrator selections and manipulations of computing objects including users, clients, organization, cloud-provider, and scores and corresponding deployment profiles. In particular, the administrator portal provide graphical user interfaces with roll-out states. For example, identifying users that have received deployments and display deployment usage data. And, when an administrator initiates deployment operations, the administrator portal can provide configuration selection options via graphical UI control elements to immediately deploy deployment packages to all selected users, or roll out the deployment packages in stages (or rings). The administrator portal can support determining whether a given application or application feature rolled out to a first set of users (e.g., a cohort) or whether the application or the application feature has been removed. Advantageously, the admin portal user interface avoids unnecessary features and provides features and functionality associated with the deployment operations described herein.

At step 54, the deployment processor engine 40 operates with deployment profiles of users, clients, tenants, and the organization generated using corresponding user models, client models, and organization models. The deployment processing engine 40 supports performing deployment operations including release (i.e., transfer of an application deployment package to a client), installation and activation, deactivation, uninstallation, update, built-in update, and version tracking. The deployment processor engine 40 can access a user deployment profile for data in the deployment profile that can be used for the integrated deployment strategy. For example, certain privacy policies and permissions of a user may determine whether or not deployment operations can be performed. In another example, the deployment processor engine 40 can specifically access tenant deployment profiles that are based on data from different tenants to define deployment operations for the particular tenant. In this regard, the deployment processor engine 40 can access the different types of deployment profiles to make determine deployment operations for the type of deployment profile.

In another example, the deployment processor engine can support installing multiple applications or application features in a single deployment package. The deployment instructions for the deployment package can include specific instructions for managing the different applications or application features. For example, exposure of different application features in a deployment package can be based on a configuration change associated with the application feature. The configuration change (e.g., flighting or dialing-up an exposure of a feature) for a first user can determine how the application works or the underlying service that are associated with the application feature. As such, as discussed in more detail below, deployment packages can further include a cloud-based configuration change that can turn on and off features at independent timeframes The deployment processor engine 40 may access a deployment package to be transmitted to a client to cause installation of the deployment package at the client. At a high level, a deployment package or deployment of a package at a client can refer to deployment operations associated with for a client application or a client web application. By way of example, with reference to a web application, deploying operations can refer to putting a shortcut to a URL on a desktop or start menu. In addition, various configuration parameters can be associated with the URL such that when clicked, the application launches in a web browser. In this regard, the efficiency in the deployment of web application can be include ensuring that the correct launch icons are used. It is also contemplated that, web applications can include a server-side configuration that can be provisioned, configured, or updated based on deployment operations to operate in associated with a client accessing the web application. For example, the server-side configuration can include selecting configuration features for which a user or the client is dependent on (e.g., parameters of the web application). In particular, those parameters can include parameters that are not configuration directly via features at the client. In this regard, a deployment package can include updating configuration features associated with a web client using deployment operations described herein. The deployment package can be accessed from different storage locations (e.g., a local store or a remote store). An administrator may selectively initiate deployment operations for a single user, a segment of user of the user base, or the entire user base. The deployment processing engine 40 may further execute an integrated deployment strategy having deployment instructions, as discussed below by way of examples.

By way of example, in operation, a deployment operations interface can be provided. The deployment operations interface can be accessed by an administrator to execute deployment operations. The deployment operations interface supports implementing different types of integrated deployment strategies. For example, an integrated deployment strategy can be associated with an entire user base or a subset (or segment) of users in the user base. It is contemplated that an administrator may selectively initiate deployment operations for a single user, a segment of user of the user base, or the entire user base. The deployment instructions can include accessing or computing a score that weights different attributes of the deployment profile. For example weights can be associated with an early adopter score and a fit score for the application.

At step 56, the deployment engine (client) 20 accesses deployment tracking instructions, track deployment usage data, and communicates the deployment usage data for a deployment package. At step 58, based on the deployment data and deployment profiles, an integrated deployment strategy for the deployment package can be updated, as discussed in more detail below. For example, deployment profiles for a first set of users can be used to identify a second set of users. The second set of users are incorporated into the integrated deployment strategy as candidates to receive the deployment package. It is contemplated that identified early adopters of a first tenant can affect the users selected for a main roll-out for the same tenant or any roll-out of a different tenant.

At step 60, based on the updated integrated deployment strategy, additional deployment operations can be executed, including executing additional deployment operations comprising causing execution of the deployment package for a second set of clients. Deployment operations can be configured per-tenant as a tenant-specific attribute. For example, the cadence of additional deployments for additional sets of users can be tenant-controlled in one configuration, while in another configuration, additional deployments are not tenant-controlled but rather managed by the distributed computing system administrators.

In one example, deployment operations for an integrated deployment strategy are generated based on an early adopter score and a fit score. The early adopter score and the fit score can be weighted and combined to rank users of the user base. A threshold ranking score can be used to identify a subset of users to be associated with the integrated deployment strategy for receive a deployment package associated with the integrated deployment strategy. The deployment package can be transmitted to clients associated with the subset of users that are identified. Any licensees associated with an application of the deployment package can be assigned to the subset of users. In particular, reclaim the application license can be based on a specific licensing model. By way of context, a traditional model for licensing can require a license before using the application. In a special license model, where licenses are temporarily granted, the deployment operations can be implemented to deploy temporary licenses and revoke (automatically or manually) the temporary licenses after the trial period. Based on deployment data, permanent licenses can then be deployed. For example, a few early adopters can be provided with a special license to try out features which are not yet paid for by the organization, such that, the software can do a soft trial based on early adopter deployment data or signals to determine they should try to sell that feature to the organization.

The integrated deployment strategy can further include deployment operations that remove deployment packages. Remove deployment packages can refer to deployment operations that uninstall or otherwise rollback a new application or a feature of a new application that deployed as part of a deployment package. By way of example, for 200 users that received a deployment package out of 1000 users, two different deployment operations can be performed. In particular, 140 users of the 200 users may have high early adopter scores (e.g., above an early adopter score threshold). As such, from the pool of 800 users, co-workers with a relationship to the 140 users and a threshold fit score can be identified to receive the deployment package. And, deployment operations can further include instructions to remove deployment package from clients of the 60 users that have low early adopter scores. As such, deployment instructions can be communicated to the clients to cause uninstallation of the deployment package.

The integrated deployment strategy can further include deployment operations that are associated with additional deployment computing objects (e.g., glyph and organization emails). For example, a glyph annotating that a particular user is an early adopter deployment group can be communicated to the user. The subset of users can automatically receive emails, training materials, or alerts indicating their clients have been updated based on the deployment package. The deployment processing engine 40 may access a deployment package to be transmitted to a client to cause installation of the deployment package at the client.

In another example, the integrated deployment strategy is associated with a collaboration application. A collaboration application can refer to applications designed to help user work on a common task based on group processes defined in the collaboration application. For example, a collaboration application can support real-time collaborative editing that allow user to engage in live, simultaneous and reversible editing of a single file. As such, an integrated deployment strategy has to include support to ensure simultaneously updates for a set of users that are identified as collaborative users of a collaboration application. In this regard, the early adopter score is not a sole factor or is a limited factor in determining whether to transmit the deployment package to a particular user associated with the collaboration application.

In operation, co-workers can be determined based on the relationship score. For example, an organization graph of connectedness between co-workers and specifically co-workers working using collaboration application can be generated. The connectedness can be quantified based on deployment operations collaboration features. The deployment operations collaboration features can be defined and tracked. For example, a count of the number of times a user sends messages to a team or co-worker, or a number of times a user co-authors a document of a collaboration application. The relationship model can be used to develop an integrated deployment strategy that avoid updating a collaboration application for a first user without updating the same collaboration application for a second user.

Moreover, an early adopter can receive one or more messages (e.g., an email, an in-app prompt) inviting the early adopter to perform actions with reference to the application or application feature associated with a deployment package. For example, the message may indicate that the early adopter should encourage their team to start using the application or the application feature. In addition, co-workers of an early adopter can be assigned license when the early adopter first launches the application. In another scenario, the co-workers of the early adopter can be assigned licenses only after the early adopter more explicitly indicates that they intend to use a collaboration application with their co-workers.

The integrated deployment strategy includes deployment tracking instructions. The deployment tracking instructions can support tracking deployment operations attributes that are used to accessing usage data associated with a deployment package. The deployment package usage data can be analyzed to support performing additional deployment operations including updating an integrated deployment strategy for the deployment package. In particular, the deployment package usage data can be analyzed to identify patterns in the early adopters such that the integrated deployment strategy is updated based on the identified patterns. For example, the deployment package usage data indicates repeat usage of the application (and/or new particular new features within the application) with segments of the user base of the organization, the integrated deployment strategy can be configured to execute deployment operations. For example, the deployment operations can include deploying the application co-worker of the early adopters or transmitting the deployment package to a second set of users having early adopter scores a medium-adopter threshold. The deployment operations can be automatically performed or may be triggered by an administrator of the deployment system. In this regard, the second set of user are receiving the deployment package based on their early adopter score, the deployment package usage data, and their relationship score relative to an early adopter. Moreover, automated rollouts to additional user (i.e., rings) could be disabled or clicked based on administrator approval for organizations that want to be more hand on with approvals.

The integrated development strategy can include retrieving deployment package feedback data from the early adopters. The deployment package feedback data can be received in order to update the integrated deployment strategy. For example, based on the deployment package feedback data, deployment operations may be accelerated or delayed or retracted. The integrated development strategy further can include deployment operations for transmitting the deployment package to all identified clients of the users in the user based. In particular, the integrated deployment strategy may be associated with deployment operations that incremental and iterative based on deployment package usage data or deployment package feedback data and corresponding insights for the deployment package usage data or deployment package feedback data. For example, the integrated development strategy can be updated such that a segment of user never have the application deployed to their clients because of user behavior indicate a low adopter score for other applications Functionality of the embodiments of the present invention have further been described, by way of an implementation and anecdotal examples, to demonstrate that the operations for providing deployment operations, based on deployment profiles, are an unconventional ordered combination of operations that operate with a deployment engine as a solution to a specific problem in deployment systems technology environments to improve computing operations and user interface navigation in deployment systems. Advantageously, the embodiments described herein improve the computing operations, functionality, and the technological process for providing the functionality described herein. Overall, these improvements result in less CPU computation, smaller memory requirements, and increased flexibility in video management systems.

Figure 2:
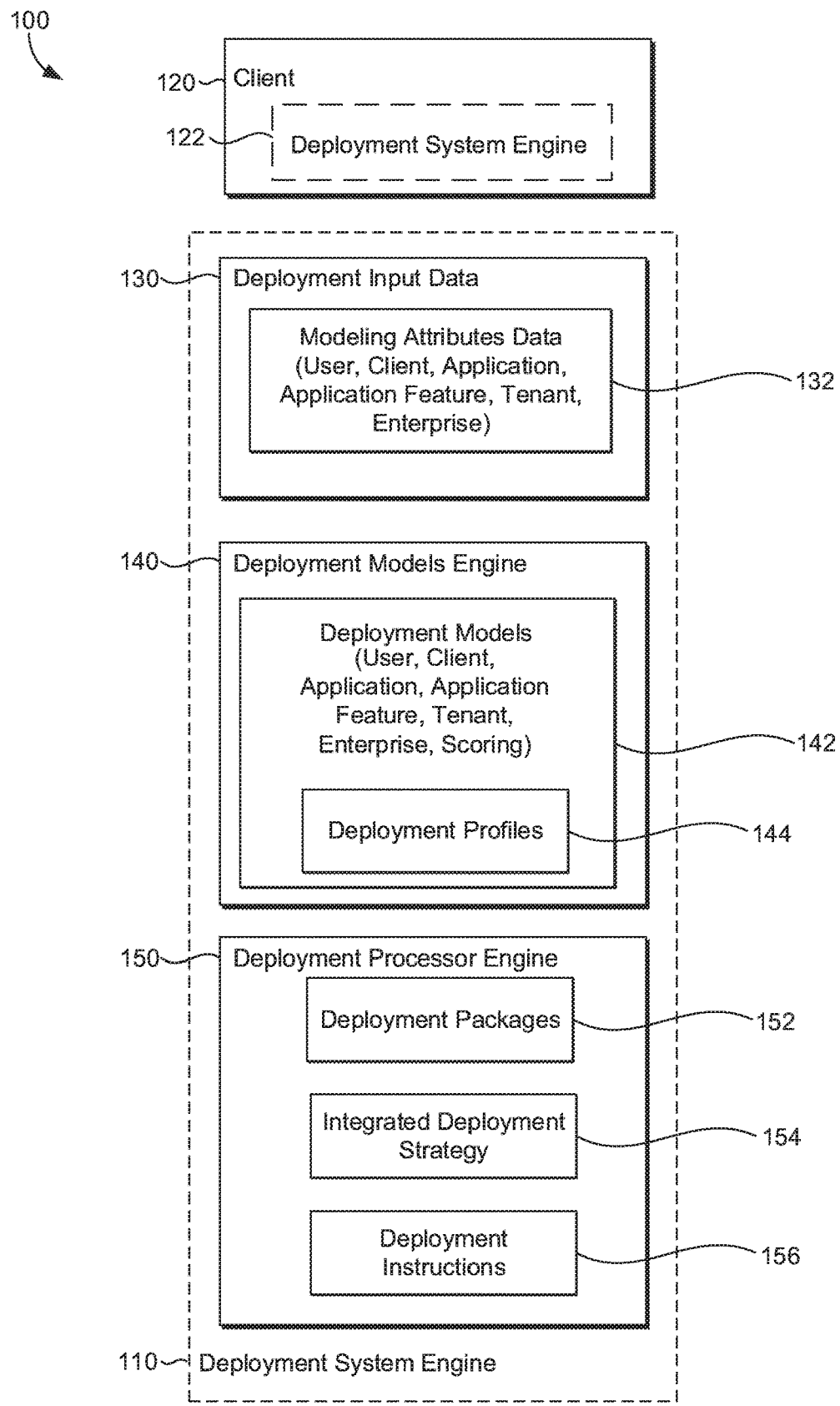
FIG. 2 is an exemplary deployment system environment for providing deployment operations based on deployment profiles in a deployment system, in accordance with aspects of the technology described herein.

Overview of Example Environments for Providing Deployment Operations Based on Deployment Profiles in a Deployment System Turning to FIG. 2, a block diagram of an exemplary technical solution environment, based on example environments described with reference to FIGS. 6, 7 and 9, for use in implementing embodiments of the technical solution are shown. Generally the technical solution environment includes a technical solution system suitable for providing the example deployment system 100 in which methods of the present disclosure may be employed. In particular, FIG. 2 shows a high level architecture of the deployment system 100 in accordance with implementations of the present disclosure. Among other engines, managers, generators, selectors, or components not shown (collectively referred to herein as "components"), the technical solution environment of deployment system 100 includes a deployment system engine 110, client 120 (including deployment system 122), deployment input data 130 (including modeling attributes data 1323), deployment models engine 140 (including deployment models 142, deployment profiles 144), deployment processor engine 150 (including deployment packages 152, integrated deployment strategy 154, and deployment instructions). The components of the deployment system 100 can be providing deployment packages using deployment system operations of an integrated deployment strategy in a deployment system.

Figure 3:
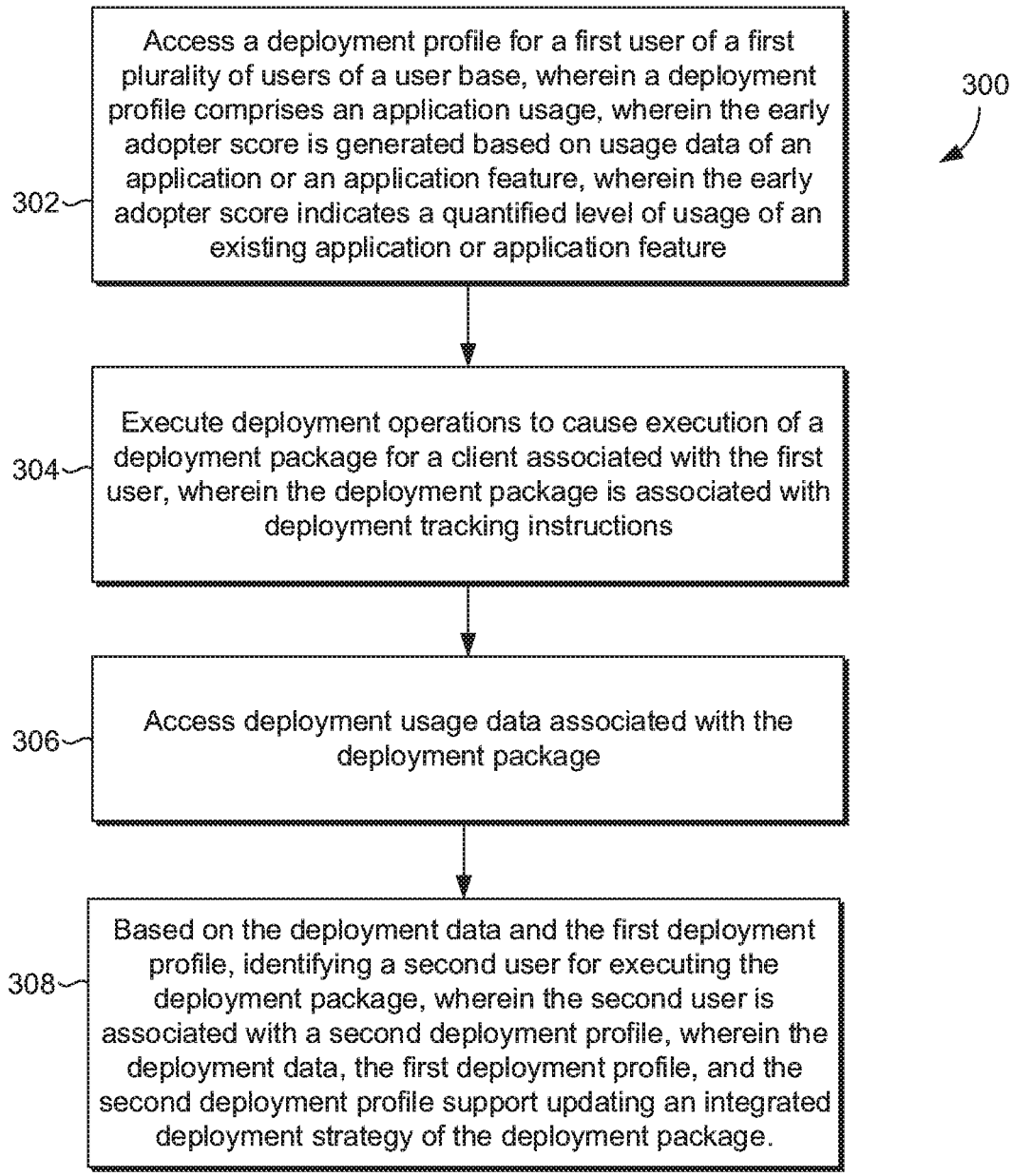
FIG. 3 provides a first exemplary method of providing deployment operations based on deployment profiles in a deployment system in accordance with aspects of the technology described herein.
Figure 4:
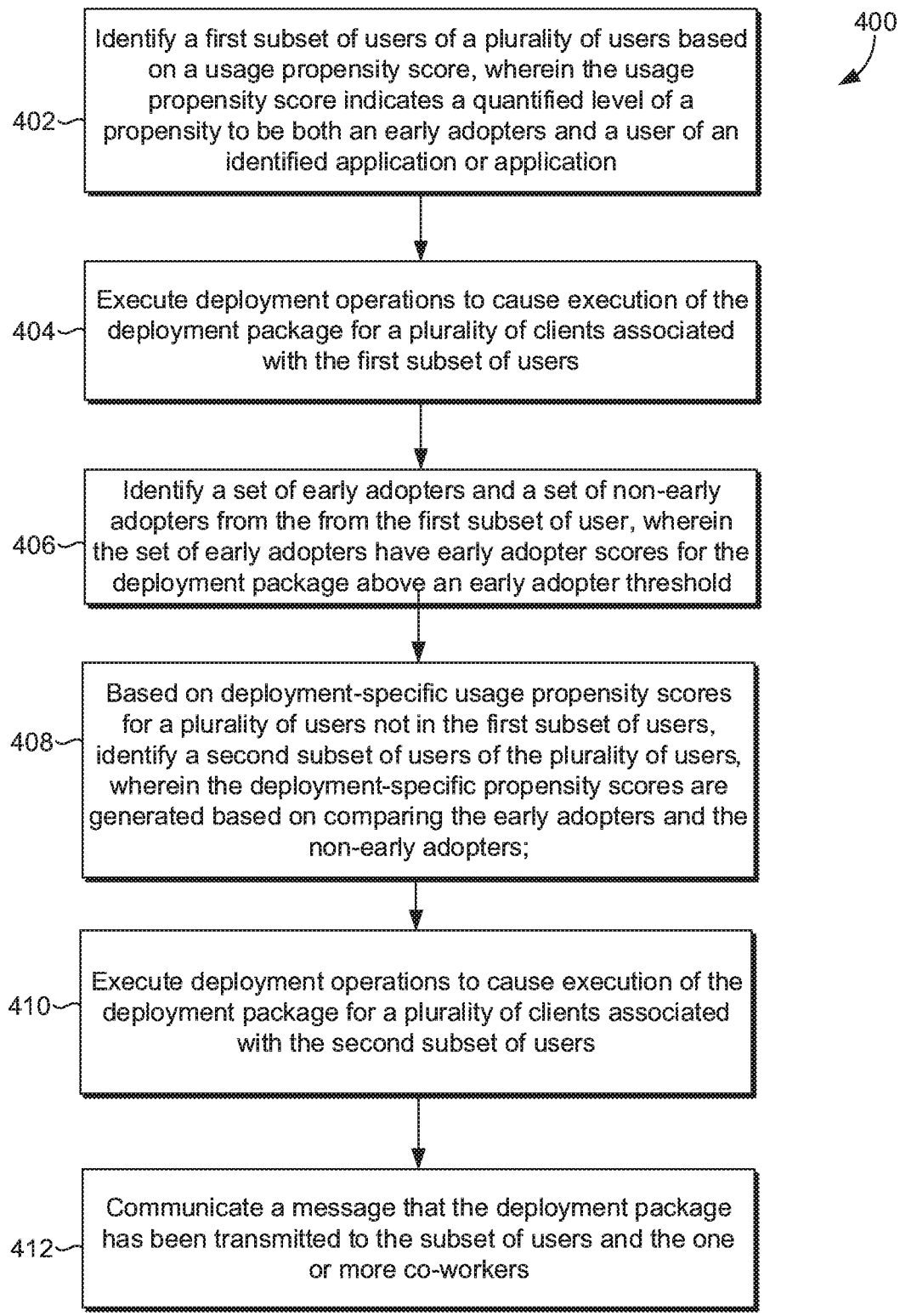
FIG. 4 provides a second exemplary method of providing deployment operations based on deployment profiles in a deployment system, in accordance with aspects of the technology described herein.
Figure 5:
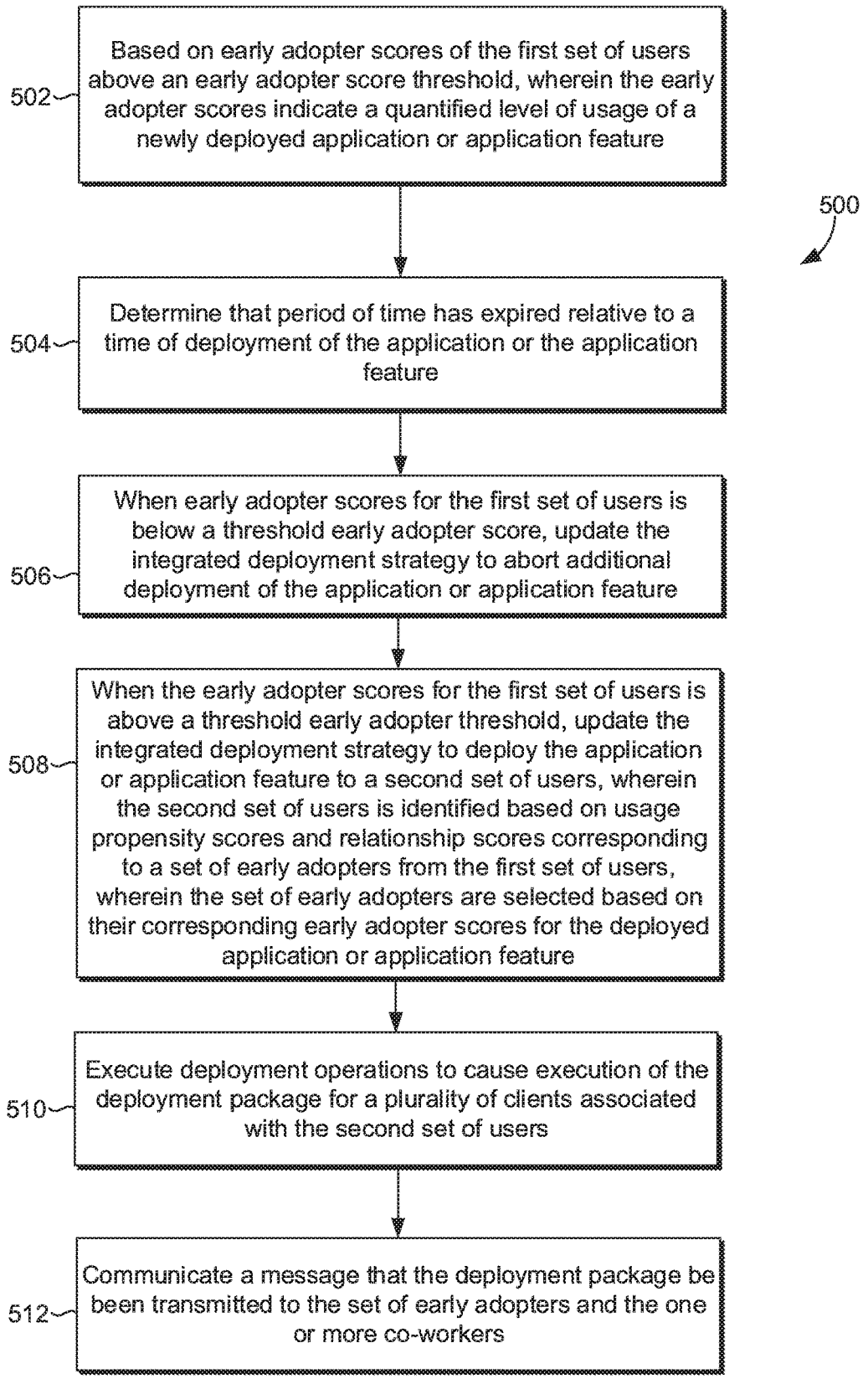
FIG. 5 provides a third exemplary method of providing deployment operations based on deployment profiles in a deployment system, in accordance with aspects of the technology described herein.

Exemplary Methods for Providing Deployment Operations Based on Deployment Profiles in a Deployment System With reference to FIGS. 3, 4 and 5, flow diagrams are provided illustrating methods for deployment operations based on deployment profiles in a deployment system. The methods may be performed using the search system described herein. In embodiments, one or more computer storage media having computer-executable instructions embodied thereon that, when executed, by one or more processors can cause the one or more processors to perform the methods in the file system.

Turning to FIG. 3, a flow diagram is provided that illustrates a method 300 for providing deployment operations based on deployment profiles in a deployment system. At block 302, access a deployment profile for a first user of a first plurality of users of a user base. A deployment profile comprises an early adopter score. The early adopter score is generated based on usage data of an application or an application feature, wherein the early adopter score indicates a quantified level of usage of an existing application or application feature.

At block 304, execute deployment operations to cause execution of a deployment package for a client associated with the first user. The deployment package is associated with deployment tracking instructions. Executing the deployment operations for the client can include one or more of the following transmitting the deployment package to the client associated with the first user to cause execution of the deployment package at the client; transmitting an icon file to the client associated with the first user to cause launch of the application based on selecting the icon file; and causing a configuration change for a cloud-based configuration of the application or the application feature.

At block 306, access deployment usage data associated with the deployment package. At block 308, based on the deployment data and the first deployment profile, identifying a second user for executing the deployment package. The second user is associated with a second deployment profile, wherein the deployment data, the first deployment profile, and the second deployment profile support updating an integrated deployment strategy of the deployment package.

Turning to FIG. 4, a flow diagram is provided that illustrates a method 400 for providing deployment operations based on deployment profiles in a deployment system. At block 402, identify a first subset of users of a plurality of users based on a usage propensity score. The usage propensity score indicates a quantified level of a propensity to be both an early adopters and a user of an identified application or application. At block 404, execute deployment operations to cause execution of the deployment package for a plurality of clients associated with the first subset of users.

At block 406, identify a set of early adopters and a set of non-early adopters from the first subset of user. The set of early adopters have early adopter scores for the deployment package above an early adopter threshold. At block 408, based on deployment-specific usage propensity scores for a plurality of users not in the first subset of users, identify a second subset of users of the plurality of users. The deployment-specific propensity scores are generated based on comparing the early adopters and the non-early adopters. At block 410, execute deployment operations to cause execution of the deployment package for a plurality of clients associated with the second subset of users. At block 412, communicate a message that the deployment package has been transmitted to the subset of users and the one or more co-workers.

Turning to FIG. 5, a flow diagram is provided that illustrates a method 500 providing deployment operations based on deployment profiles in a deployment system. At block 502, based on early adopter scores of the first set of users above an early adopter score threshold. The early adopter scores indicate a quantified level of usage of a newly deployed application or application feature. At block 504, determine that period of time has expired relative to a time of deployment of the application or the application feature.

At block 506, when early adopter scores for the first set of users is below a threshold early adopter score, update the integrated deployment strategy to abort additional deployment of the application or application feature. At block 508, when the early adopter scores for the first set of users is above a threshold early adopter threshold, update the integrated deployment strategy to deploy the application or application feature to a second set of users. The second set of users is identified based on usage propensity scores and relationship scores corresponding to a set of early adopters from the first set of users. The set of early adopters are selected based on their corresponding early adopter scores for the deployed application or application feature. At block 510, execute deployment operations to cause execution of the deployment package for a plurality of clients associated with the second set of users. At block 512, Communicate a message that the deployment package be been transmitted to the set of early adopters and the one or more co-workers.

Example System Environment

Figure 6:
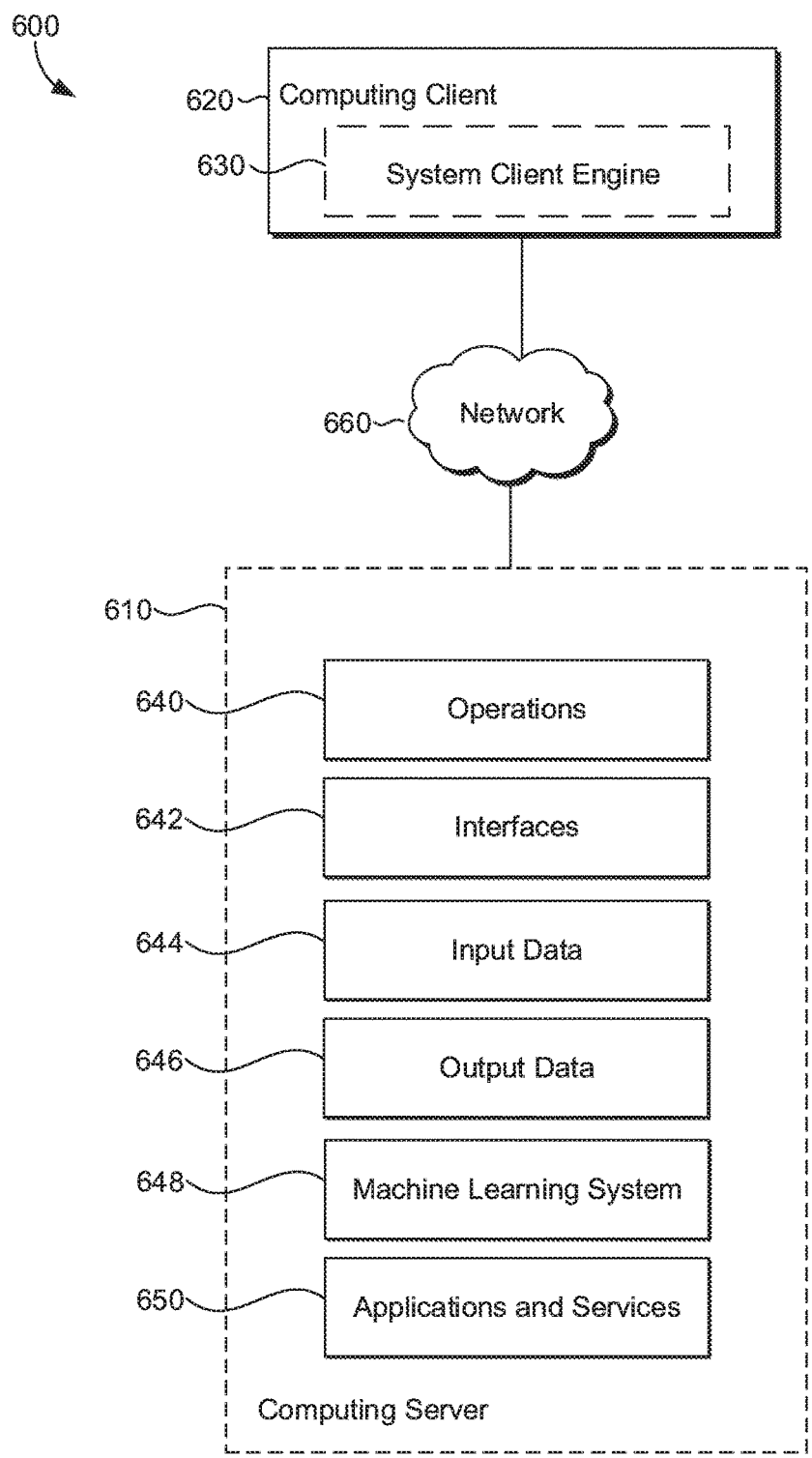
FIG. 6 provides a block diagram of an exemplary system environment suitable for use in implementing aspects of the technology described herein.

With reference to FIG. 6, FIG. 6 illustrates an example system environment 600 in which implementations of the technical solution may be employed. In particular, FIG. 6 illustrates a client-server environment that includes computing server 610 and computing client 620 having a system client engine that can mirror components in the computing server 610. The computing server 610 includes operations 640, interfaces 642, input data 644, output data 646, machine learning engine 648, and application and service 650 that are part of a technical solution environment to support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

The technical solution system can further include a machine learning system. A machine-learning system may include machine-learning tools and training components. Machine-learning systems can include machine-learning tools that are utilized to perform operations in different types of technology fields. Machine-learning systems can include pre-trained machine-learning tools that can further be trained for a particular task or technological field. At a high level, machine-learning is a field of study that gives computers the ability to learn without being explicitly programmed. Machine-learning explores the study and construction of machine-learning tools, including machine-learning algorithm or models, which may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. It is contemplated that different machine-learning tools may be used, for example, Logistic Regression (LR), Naive-Bayes, Random Forest (RF), neural networks (NN), matrix factorization, and Support Vector Machines (SVM) tools may be used for addressing problems in different technological fields.

In general, there are two types of problems in machine-learning: classification problems and regression problems. Classification problems, also referred to as categorization problems, aim at classifying items into one of several category values (for example, is this email SPAM or not SPAM). Regression algorithms aim at quantifying some items (for example, by providing a value that is a real number). Machine-learning algorithms can provide a score (e.g., a number from 1 to 100) to qualify one or more products as a match for a user of the online marketplace. It is contemplated that cluster analysis or clustering can be performed as part of classification, where clustering refers to the task of grouping a set of objects in such a way that objects in the same group (called a cluster) are more similar (in some sense) to each other than to those in other groups (clusters). It is a main task of exploratory data mining, and a common technique for statistical data analysis, used in many fields, including pattern recognition, image analysis, information retrieval, bioinformatics, data compression, computer graphics and machine learning.

Machine-learning algorithms utilize the training data to find correlations among identified features (or combinations of features) that affect an outcome. A trained machine-learning model may be implemented to perform a machine-learning operation based on a combinations of features. An administrator of a machine-learning system may also determine which of the various combinations of features are relevant (e.g., lead to desired results), and which ones are not. The combinations of features determined to be (e.g., classified as) successful are input into a machine-learning algorithm for the machine-learning algorithm to learn which combinations of features (also referred to as "patterns") are "relevant" and which patterns are "irrelevant." The machine-learning algorithms utilize features for analyzing the data to generate an output or an assessment. A feature can be an individual measurable property of a phenomenon being observed. The concept of feature is related to that of an explanatory variable used in statistical techniques such as linear regression. Choosing informative, discriminating, and independent features is important for effective operation of the machine-learning system in pattern recognition, classification, and regression. Features may be of different types, such as numeric, strings, and graphs.

The machine-learning algorithms utilize the training data to find correlations among the identified features that affect the outcome or assessment. The training data includes known data for one or more identified features and one or more outcomes. With the training data and the identified features the machine-learning tool is trained. The machine-learning tool determines the relevance of the features as they correlate to the training data. The result of the training is the trained machine-learning model. When the machine-learning model is used to perform an assessment, new data is provided as an input to the trained machine-learning model, and the machine-learning model generates the assessment as output.

Example Distributed Computing System Environment

Figure 7:
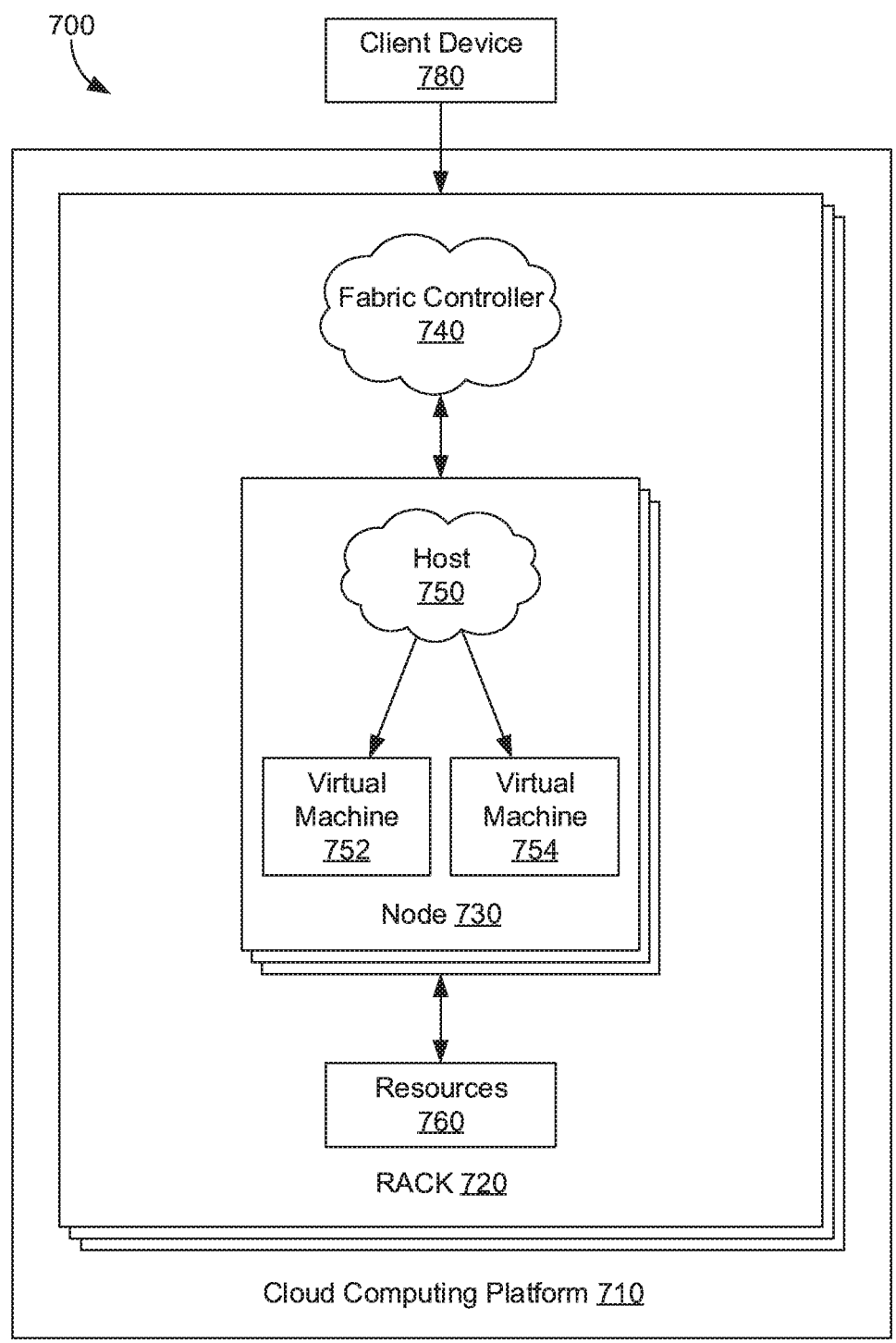
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Distributed Computing Environment

Figure 8:
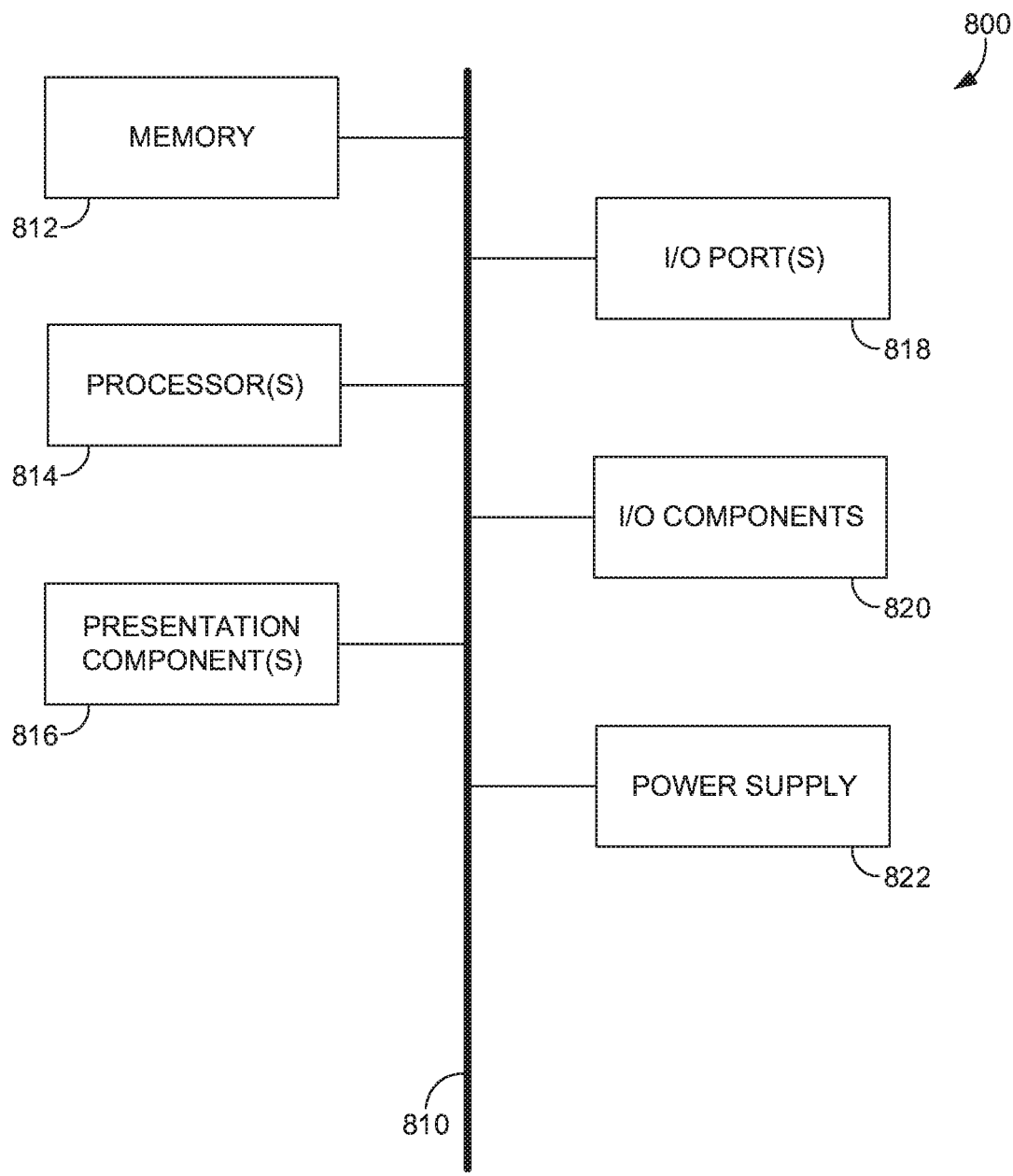
FIG. 8 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
   one or more computer processors; and
   computer memory storing computer-useable instructions that, when used by the one or more computer processors, cause the one or more computer processors to perform functions comprising:
      accessing a first deployment profile for a first user of a first plurality of users of a user base, wherein:
         the first deployment profile comprises an early adopter score,
         the early adopter score is generated based on usage data of an application or an application feature, and
         the early adopter score indicates a quantified level of usage of the application or application feature;
      based on the first deployment profile, executing deployment operations to cause execution of a deployment package for a client associated with the first user, wherein the deployment package is associated with deployment tracking instructions, and the deployment package is not executed for a plurality of clients associated with the user base;
      based on the deployment tracking instructions, accessing deployment data associated with the deployment package; and based on the deployment data and the first deployment profile, identifying a second user for executing the deployment package, wherein:
the second user is associated with a second deployment profile, and
the deployment data, the first deployment profile, and the second deployment profile support updating an integrated deployment strategy of the deployment package.

2. The system of claim 1, wherein:
deployment profiles support storing at least two of the following: the early adopter score, a fit score, a relationship score, a diversity score, a usage propensity score, and a deployment-specific usage propensity score, and
the integrated deployment strategy is updated based on two or more scores.

3. The system of claim 1, wherein:
the deployment operations associated with the integrated deployment strategy and an update integrated deployment strategy are accessed based an administrator portal, and
the administrator portal comprises graphical user interfaces that support configuring and monitoring the deployment operations.

4. The system of claim 1, wherein the execution of the deployment operations for the client comprises one or more of the following:
transmitting the deployment package to the client associated with the first user to cause the execution of the deployment package at the client;
transmitting an icon file to the client associated with the first user to cause launch of the application based on selecting the icon file; and
causing a configuration change for a cloud-based configuration of the application or the application feature.

5. The system of claim 1, wherein the memory stores the computer-useable instructions that, when used by the one or more computer processors, cause the one or more computer processors to further perform functions comprising:
based on a plurality of deployment profiles for the first plurality of users, identifying, a first subset of users of the first plurality of users based on a usage propensity score, wherein the usage propensity score indicates a quantified level of a propensity to be both an early adopter and a user of the application or the application feature;
executing the deployment operations to cause the execution of the deployment package for a first plurality of clients associated with the first subset of users;
identify a set of early adopters and a set of non-early adopters from the first subset of users, wherein the set of early adopters have early adopter scores for the deployment package above an early adopter threshold score and the set of non-early adopters have early adopter scores for the deployment package below the early adopter threshold score;
based on deployment-specific usage propensity scores for users not in the first subset of users, identify a second subset of users of the first plurality of users, wherein the deployment-specific propensity scores are generated based on comparing the early adopters and the non-early adopters; and
executing the deployment operations to cause the execution of the deployment package for a second plurality of clients associated with the second subset of users.

6. The system of claim 5, wherein the memory stores the computer-useable instructions that, when used by the one or more computer processors, cause the one or more computer processors to further perform a function comprising causing removal of the deployment package from a plurality of clients associated with the non-early adopters, wherein causing the removal of the deployment package associated with the non-early adopters further comprises reclaiming application licenses associated with the plurality of clients associated with the non-early adopters.

7. The system of claim 5, wherein the first subset of users is identified from the first plurality of users based in part on a diversity score that indicates a quantified level of difference, based on one or more attributes of the first plurality of users.

8. One or more computer-storage media having computer-executable instructions embodied thereon that, when executed by a computing system having a processor and memory, cause the processor to:
access a first deployment profile for a first user of a first plurality of users of a user base, wherein the first deployment profile comprises an early adopter score, wherein:
the early adopter score is generated based on usage data of an application or an application feature, and
the early adopter score indicates a quantified level of usage of the application or application feature;
based on the first deployment profile, execute deployment operations to cause execution of a deployment package for a client associated with the first user, wherein the deployment package is associated with deployment tracking instructions, and the deployment package is not executed for a plurality of clients associated with the user base;
based on the deployment tracking instructions, access deployment data associated with the deployment package; and
based on the deployment data and the first deployment profile, identify a second user for executing the deployment package, wherein:
the second user is associated with a second deployment profile, and
the deployment data, the first deployment profile, and the second deployment profile support updating an integrated deployment strategy of the deployment package.

9. The media of claim 8, wherein:
deployment profiles support storing at least two of the following: the early adopter score, a fit score, a relationship score, a diversity score, a usage propensity score, and a deployment-specific usage propensity score, and
the integrated deployment strategy is updated based on two or more scores.

10. The media of claim 8, wherein:
the deployment operations associated with the integrated deployment strategy and an update integrated deployment strategy are accessed based an administrator portal, and
the administrator portal comprises graphical user interfaces that support configuring and monitoring the deployment operations.

11. The media of claim 8, wherein the execution of the deployment operations for the client comprises one or more of the following:

transmitting the deployment package to the client associated with the first user to cause the execution of the deployment package at the client;
transmitting an icon file to the client associated with the first user to cause launch of the application based on selecting the icon file; and
causing a configuration change for a cloud-based configuration of the application or the application feature.

12. The media of claim 8, wherein the computer-executable instructions embodied thereon that, when executed by the computing system having the processor and memory, cause the processor to:
based on a plurality of deployment profiles for the first plurality of users, identifying, a first subset of users of the first plurality of users based on a usage propensity score, wherein the usage propensity score indicates a quantified level of a propensity to be both an early adopter and a user of the application or the application feature;
executing the deployment operations to cause the execution of the deployment package for a first plurality of clients associated with the first subset of users;
identify a set of early adopters and a set of non-early adopters from the first subset of users, wherein the set of early adopters have early adopter scores for the deployment package above an early adopter threshold score and the set of non-early adopters have early adopter scores for the deployment package below the early adopter threshold score;
based on deployment-specific usage propensity scores for users not in the first subset of users, identify a second subset of users of the first plurality of users, wherein the deployment-specific propensity scores are generated based on comparing the early adopters and the non-early adopters; and
executing the deployment operations to cause the execution of the deployment package for a second plurality of clients associated with the second subset of users.

13. The media of claim 12, wherein the computer-executable instructions embodied thereon that, when executed by the computing system having the processor and memory, cause the processor to cause removal of the deployment package from a plurality of clients associated with the non-early adopters, wherein causing the removal of the deployment package associated with the non-early adopters further comprises reclaiming application licenses associated with the plurality of clients associated with the non-early adopters.

14. The media of claim 12, wherein the first subset of users is identified from the first plurality of users based in part on a diversity score that indicates a quantified level of difference, based on one or more attributes of the first plurality of users.

15. A computer-implemented method comprising:
accessing a first deployment profile for a first user of a first plurality of users of a user base, wherein the first deployment profile comprises an early adopter score, wherein:
the early adopter score is generated based on usage data of an application or an application feature, and
the early adopter score indicates a quantified level of usage of the application or application feature;
based on the deployment profile, executing deployment operations to cause execution of a deployment package for a client associated with the first user, wherein the deployment package is associated with deployment tracking instructions, and the deployment package is not executed for a plurality of clients associated with the user base;
based on the deployment tracking instructions, accessing deployment data associated with the deployment package; and
based on the deployment data and the first deployment profile, identifying a second user for executing the deployment package, wherein:
the second user is associated with a second deployment profile, and
the deployment data, the first deployment profile, and the second deployment profile support updating an integrated deployment strategy of the deployment package.

16. The method of claim 15, wherein:
deployment profiles support storing at least two of the following: the early adopter score, a fit score, a relationship score, a diversity score, a usage propensity score, and a deployment-specific usage propensity score, and
the integrated deployment strategy is updated based on two or more scores.

17. The method of claim 15, wherein:
the deployment operations associated with the integrated deployment strategy and an update integrated deployment strategy are accessed based an administrator portal, and
the administrator portal comprises graphical user interfaces that support configuring and monitoring the deployment operations.

18. The method of claim 15, wherein execution of the deployment operations for the client comprises one or more of the following:
transmitting the deployment package to the client associated with the first user to cause the execution of the deployment package at the client;
transmitting an icon file to the client associated with the first user to cause launch of the application based on selecting the icon file; and
causing a configuration change for a cloud-based configuration of the application or the application feature.

19. The method of claim 15, further comprising:
based on a plurality of deployment profiles for the first plurality of users, identifying, a first subset of users of the first plurality of users based on a usage propensity score, wherein the usage propensity score indicates a quantified level of a propensity to be both an early adopter and a user of a user of the application or the application feature;
executing the deployment operations to cause the execution of the deployment package for a first plurality of clients associated with the first subset of users;
identify a set of early adopters and a set of non-early adopters from the first subset of users, wherein the early adopters have early adopter scores for the deployment package above an early adopter threshold score and the set of non-early adopters have early adopter scores for the deployment package below the early adopter threshold score;
based on deployment-specific usage propensity scores for users not in the first subset of users, identify a second subset of users of the first plurality of users, wherein the deployment-specific propensity scores are generated based on comparing the early adopters and the non-early adopters; and executing the deployment operations to cause the execution of the deployment package for a second plurality of clients associated with the second subset of users.

20. The method of claim 19, further comprising causing removal of the deployment package from a plurality of clients associated with the non-early adopters, wherein causing the removal of the deployment package associated with the non-early adopters further comprises reclaiming application licenses associated with the plurality of clients associated with the non-early adopters.

\* \* \* \* \*